United States Patent [19]

Stadelmann

[11] Patent Number: 5,675,881
[45] Date of Patent: Oct. 14, 1997

[54] METHOD OF EXCHANGING A MACHINE PART AND EXCHANGE UNIT FOR EXCHANGING A MACHINE PART

[75] Inventor: Peter W. Stadelmann, Thalwil, Switzerland

[73] Assignee: Asea Brown Boveri AG, Baden, Switzerland

[21] Appl. No.: 414,731

[22] Filed: Mar. 31, 1995

[30] Foreign Application Priority Data

Jul. 2, 1994 [DE] Germany ............... 44 23 324.8

[51] Int. Cl.$^6$ ............... B23P 11/00; F16M 1/00
[52] U.S. Cl. ............... 29/402.08; 29/888.011; 248/670; 248/679
[58] Field of Search ............... 29/888.011, 888.021, 29/402.03, 402.08; 248/639, 670, 672, 678, 679

[56] References Cited

U.S. PATENT DOCUMENTS

| | | | |
|---|---|---|---|
| 4,682,754 | 7/1987 | Ebata et al. | 248/679 X |
| 4,694,190 | 9/1987 | Lane et al. | 247/679 X |
| 5,297,770 | 3/1994 | Drexel et al. | 248/679 |

FOREIGN PATENT DOCUMENTS

| | | | |
|---|---|---|---|
| 1015273 | 9/1957 | Germany. | |
| 1551192 | 4/1970 | Germany. | |
| 203 959 | 11/1983 | Germany | 248/679 |

Primary Examiner—S. Thomas Hughes
Attorney, Agent, or Firm—Burns, Doane, Swecker & Mathis, L.L.P.

[57] ABSTRACT

In a method of exchanging a machine part of a machine plant, the machine part to be replaced being one of multiple machine parts of the machine plant, the multiple machine parts being coupled to one another and being arranged on a common table plate which is anchored, via individual supports, in the ground, and which has recesses for accommodating the machine parts, a metal frame is set up. Bearings are provided on a new machine part, and the machine part is assembled, oriented, and tested on the metal frame. A machine part to be replaced is uncoupled from the multiple machine parts. The machine part to be replaced is removed from a recess in the table plate. Ground supports for the new machine part on the metal frame are installed and anchored to the ground in the area of the recess. The new machine part is positioned on the metal frame on the metal supports. The new machine part on the metal frame is connected to the metal supports.

4 Claims, 2 Drawing Sheets

METHOD OF EXCHANGING A MACHINE PART AND EXCHANGE UNIT FOR EXCHANGING A MACHINE PART

BACKGROUND OF THE INVENTION

1. Field of the Invention

The invention relates to a method of exchanging a machine part of a machine plant whose principal machine parts are coupled to one another, are arranged on a common table plate which is anchored via individual supports in the ground either directly or via a sole plate, and which has recesses for accommodating the machine parts.

2. Discussion of Background

The multi-housing turbine group of a steam power plant in particular is regarded as such a machine plant, the machine parts being in the form of the individual turbine parts and the generator.

If a machine part is replaced, the size of the recess in the table plate must be adapted to the dimensions of the new machine part. This is done upon enlarging the recess by chipping out concrete and cutting off steel reinforcing rods. If the recess has to be made smaller, the steel reinforcing rods are exposed by chipping out concrete, and new steel reinforcing rods are attached, encased and covered with concrete. This concrete work produces a great deal of noise and dust and is very time-consuming and is thus very cost-intensive due to the long idle period of the steam turbine group.

Here, it is especially time-consuming to make the recess in the table plate smaller, since the exposing and attaching of the steel reinforcing rods has to be done very carefully, and the concrete surfaces are to be treated and prepared carefully in order to obtain a stable connection between the table plate and the freshly applied concrete.

SUMMARY OF THE INVENTION

Accordingly, one object of the invention is to provide a novel method of exchanging a machine part of a machine plant of the type mentioned at the beginning, in which method time-consuming and thus cost-intensive concrete work which arises when making the recess in the table plate smaller is avoided.

According to the invention this is achieved according to a method where, in a preparation phase, a metal frame is set up in the area of the machine plant, on which metal frame a new machine part is provided with bearings, is ready assembled, and is orientated and tested. In an exchange phase, the machine part to be replaced is uncoupled from the remaining machine parts and is removed from the table plate with lifting means. metal supports are installed in the area of the recess in the table plate and are connected to the sole plate or the ground, and the new machine part together with the metal frame is put down on the metal supports with lifting means and after the final orientation, is connected to the metal supports.

The advantages of the invention can be seen, inter alia, in the fact that the time needed to exchange a machine part is clearly reduced, and expensive concrete work is dispensed with. The machine part can be assembled and tested before the steam turbine group is stopped, which, like the above advantage, reduces the idle time of the steam turbine group. Since the metal frame is separately supported, its dynamic behavior can be positively influenced by the number of metal supports and their dimensions.

It is therefore especially convenient that the metal frame is adjustably connected to the table plate so that the dynamic behavior of the unit of machine part and metal frame is not affected by the table plate.

BRIEF DESCRIPTION OF TE DRAWINGS

A more complete appreciation of the invention and many of the attendant advantages thereof will be readily obtained as the same becomes better understood by reference to the following detailed description when considered in connection with the accompanying drawings, wherein.

Only the elements essential for understanding the invention are shown, with reference to which elements the novel method is explained.

DESCRIPTION OF THE PREFERRED EMBODIMENTS

Figure 1:
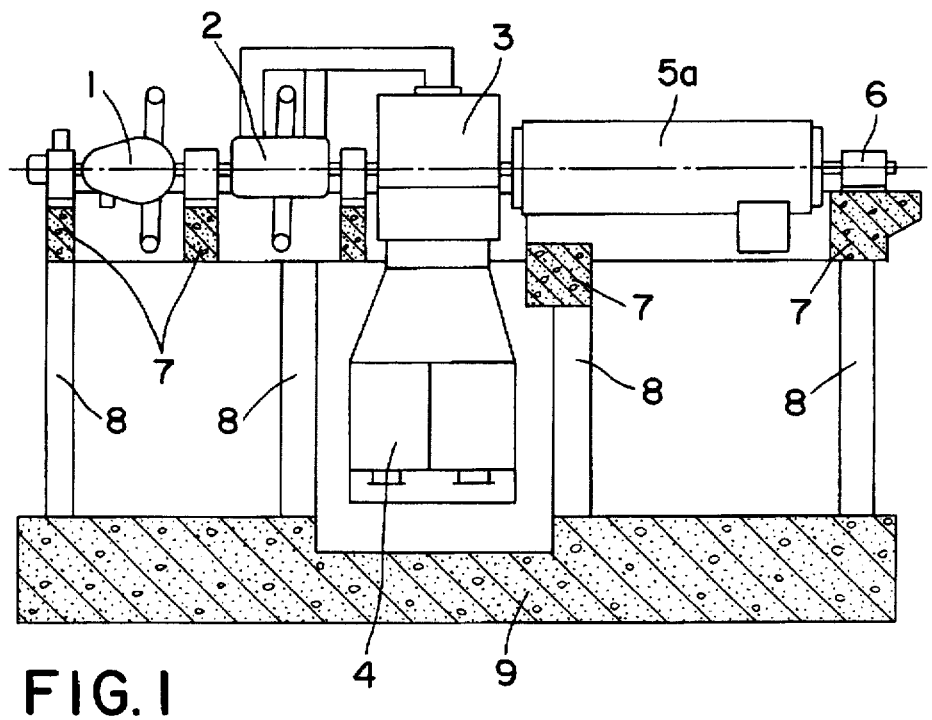
FIG. 1 shows the side view of a machine plant with foundation in longitudinal section.

Referring now to the drawings, wherein like reference numerals designate identical or corresponding parts throughout the several views, in FIG. 1 the machine plant represents a steam turbine group, essentially consisting of a high-pressure turbine section 1, a medium-pressure turbine section 2 and a low-pressure turbine section 3 which is connected to a condenser 4. The turbine sections are coupled to one another as well as to a generator 5 and an exciter 6. The turbine group rests on a foundation which here is composed of a table plate 7, a plurality of individual supports 8 and a sole plate 9. Of the table plate 7, only the cross beams are apparent; the sole plate 9 lies on the ground.

Figure 2:
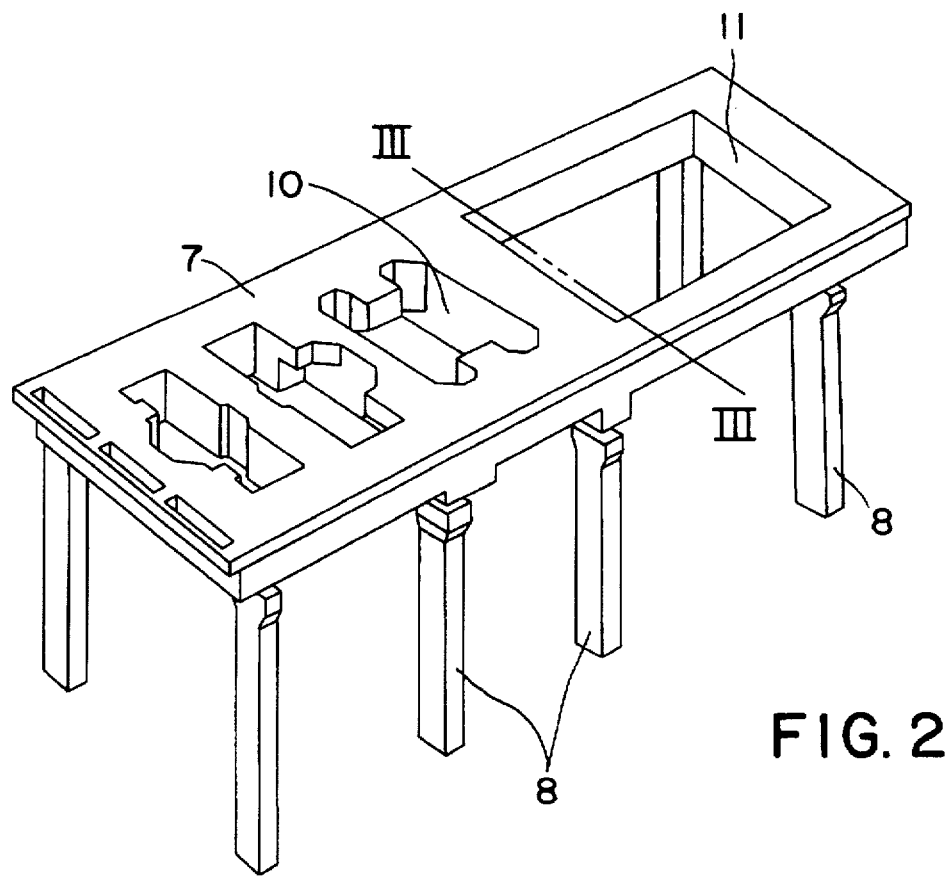
FIG. 2 shows a perspective view of a foundation consisting of table and individual supports.

FIG. 2 shows a vacant foundation for a turbine group having a low-pressure turbine section, for which the recess 10 is provided. The recess 11 accommodates the generator. The foundation can be a monolithic concrete foundation or a spring foundation having individual supports.

To explain the invention it is assumed that the generator 5a arranged on a foundation according to FIG. 2 is to be replaced without delay by a new generator 5b of smaller diameter.

Accordingly, the machine part 5a to be replaced and the machine part 5b to be newly coupled will be generators below, whereas all the turbine sections 1–3 are regarded as the remaining machine parts.

The procedure now distinguishes between two separate periods.

In the preparation phase the following measures are to be taken:

On the assumption that a plane surface is available in direct proximity to the machine plant, specifically the generator, a metal frame 12 is constructed on the plane surface.

Figure 3:
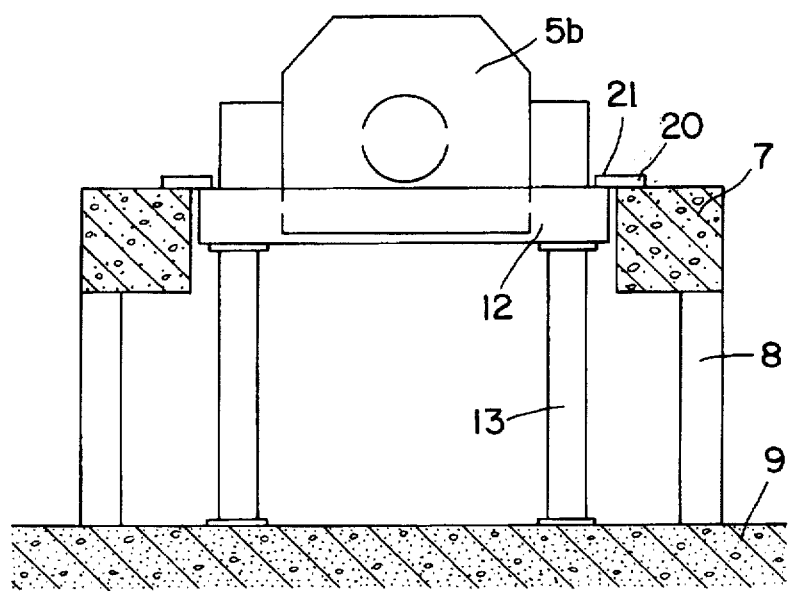
FIG. 3 shows a cross section according to section III—III in FIG. 2 after the exchange of the generator.
Figure 4:
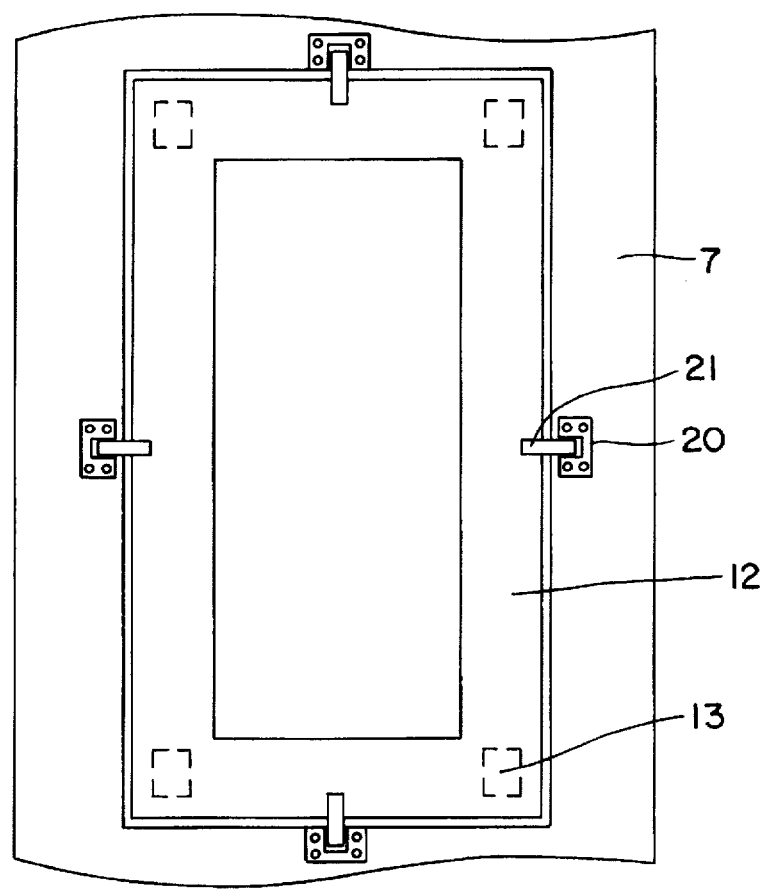
FIG. 4 shows a plan view of the installed frame without generator.

The metal frame 12 is designed according to FIGS. 3 and 4 in such a way that its external dimensions are smaller than the recess 11 in the table plate and that its internal dimensions are greater than the new generator 5b.

The generator 5b is set up on the metal frame 12. The stator is put on, the bearing blocks are mounted, and the rotor is moved into the stator and put down in the bearings. The generator is orientated for its end position and is firmly connected to the metal frame 12. The unit of new generator 5b and metal frame 12 is called the exchange unit below. The electrical test is carried out by means of an electric motor (not shown).

If not already present, a lifting device is set up above the generators, which lifting device enables the generators to be lifted and moved. This lifting device is normally a movable crane unit, which is not shown in the drawings.

The exchange phase, when the turbine group is stopped, begins with the generator 5a being uncoupled from the turbine 3, released from the table plate 7, removed with the lifting device and put down next to the machine plant.

According to FIGS. 3 and 4, at least four metal supports 13 are now put into the recess in the table plate and are fastened to the sole plate 9. A possible type of fastening would be, for example, bolting with subsequent concrete grouping.

The exchange unit (5b, 12) is now lifted over the table plate 7 by means of the lifting device and is lowered onto the metal supports 13. The exchange unit (5b, 12) is now adjusted in the vertical by placing shims (not shown) of different thickness underneath it, for which reason the unit may have to lifted and lowered several times. The orientation in the longitudinal and transverse direction is carried out by means of appropriately arranged pushing devices.

After the final adjustment, the metal frame 12 is firmly connected to the metal supports 13, for example by bolting.

According to FIGS. 3 and 4, the metal frame 12 is in addition adjustably connected to the table plate 7. To this end, a metal plate having a rectangular groove 20 is attached, for example, to the table plate 7, and a metal wedge 21 shaped in the same way is attached to the metal frame. To illustrate this, a possible solution having four wedge or tongue groove systems is shown in FIG. 4.

The exchange phase is thus complete, the generator 5b is coupled and the requisite connections are made.

The invention is of course not restricted to the method shown and described. The metal frame and the metal supports, with due allowance for the geometrical requirements, can also be configured in another way, with particular regard to the desired dynamic behavior. Any other groove-wedge or tongue shapes and arrangements are suitable in principle for the adjustable connection between metal frame and table plate.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of replacing a machine part of a machine plant, the machine part to be replaced being one of multiple machine parts of the machine plant, the multiple machine parts being coupled to one another and being arranged on a common table plate which is anchored, via individual supports, in the ground, and which has recesses for accommodating the machine parts, comprising the steps of:

setting up a frame;

providing a new machine part on the frame;

uncoupling a machine part to be replaced from the multiple machine parts;

removing the machine part to be replaced from a first recess in the table plate;

installing and anchoring supports for the new machine part to the ground in the area of the first recess;

positioning the frame and the new machine part on the supports for the new machine part; and connecting the frame and the new machine part to the supports for the new machine part.

2. The method as claimed in claim 1, comprising the further step of connecting the frame to the table plate.

3. The method as claimed in claim 2, wherein the step of connecting the frame to the table plate includes connecting the frame to the table plate with a tongue and groove system.

4. The method as claimed in claim 1, wherein the support installing and anchoring step includes providing a first number and a first form of supports for the new machine part to provide a first dynamic behavior of the new machine part, or providing one or more of a second number and a second form of supports for the new machine part to provide a second dynamic behavior of the new machine part.

* * * * *